(12) United States Patent
Duis et al.

(10) Patent No.: US 11,052,596 B2
(45) Date of Patent: Jul. 6, 2021

(54) APPARATUSES AND METHODS FOR FORMING THREE-DIMENSIONAL OBJECTS

(71) Applicant: DSM IP Assets, B.V., Te Heerlen (NL)

(72) Inventors: Patrick Gerardus Duis, Echt (NL); Abel Frans Pot, Echt (NL); Yvonne Van Veen, Echt (NL)

(73) Assignee: DSM IP Assets B.V., Heerlen (NL)

( * ) Notice: Subject to any disclaimer, the term of this patent is extended or adjusted under 35 U.S.C. 154(b) by 190 days.

(21) Appl. No.: 15/554,972

(22) PCT Filed: Mar. 10, 2016

(86) PCT No.: PCT/EP2016/055144
§ 371 (c)(1),
(2) Date: Aug. 31, 2017

(87) PCT Pub. No.: WO2016/142472
PCT Pub. Date: Sep. 15, 2016

(65) Prior Publication Data
US 2018/0079135 A1 Mar. 22, 2018

(30) Foreign Application Priority Data

Mar. 11, 2015 (EP) .................................. 15158654

(51) Int. Cl.
*B29C 64/118* (2017.01)
*B33Y 10/00* (2015.01)
(Continued)

(52) U.S. Cl.
CPC .......... *B29C 64/118* (2017.08); *B29C 64/209* (2017.08); *B29C 64/227* (2017.08);
(Continued)

(58) Field of Classification Search
CPC ..... B29C 64/10; B29C 64/118; B29C 63/307; B29C 63/321; B29C 63/329; B29C 63/343; B33Y 10/00; B33Y 30/00
See application file for complete search history.

(56) References Cited

U.S. PATENT DOCUMENTS 5,764,521 A * 6/1998 Batchelder .............. B29C 48/92
700/196
6,129,872 A * 10/2000 Jang ........................ B29C 48/48
264/75
(Continued)

FOREIGN PATENT DOCUMENTS

CN    1207187       6/2005
EP    1950018 A1    7/2008
(Continued)

OTHER PUBLICATIONS

International Search Report dated May 3, 2016.

*Primary Examiner* — Francisco W Tschen
*Assistant Examiner* — Edgaredmanuel Troche
(74) *Attorney, Agent, or Firm* — Daniel S. Bujas

(57) ABSTRACT

Apparatuses and methods for producing three-dimensional objects are disclosed. In an embodiment, an apparatus for solid freeform fabrication comprises a movable nozzle comprising a nozzle opening, a heating element connected to the movable nozzle, a driver connected to the movable nozzle, a platform for receiving a build material from the movable nozzle, and a hopper for providing the build material to the driver, the hopper comprising a hopper opening, wherein the nozzle opening and the hopper opening are capable of simultaneous alignment on a straight axis such that the build (Continued)

material, when present, is capable of traveling along the straight axis at least from the hopper opening until the build material attains a flowable state.

20 Claims, 4 Drawing Sheets

(51) Int. Cl.
    *B33Y 30/00*         (2015.01)
    *B29C 64/209*      (2017.01)
    *B29C 64/295*      (2017.01)
    *B29C 64/329*      (2017.01)
    *B29C 64/245*      (2017.01)
    *B29C 64/227*      (2017.01)
    *B29C 64/255*      (2017.01)
    *B29K 105/12*      (2006.01)

(52) U.S. Cl.
    CPC .......... *B29C 64/245* (2017.08); *B29C 64/255* (2017.08); *B29C 64/295* (2017.08); *B29C 64/329* (2017.08); *B33Y 10/00* (2014.12); *B33Y 30/00* (2014.12); *B29K 2105/12* (2013.01)

(56) References Cited

U.S. PATENT DOCUMENTS

| | | | |
|---|---|---|---|
| 2003/0063138 A1 | 4/2003 | Varnon et al. | |
| 2013/0333798 A1* | 12/2013 | Bosveld | B29C 64/329 141/2 |
| 2014/0154347 A1 | 6/2014 | Dilworth | |
| 2015/0145168 A1* | 5/2015 | Rodgers | B33Y 10/00 264/308 |
| 2015/0183161 A1* | 7/2015 | Molinari | B29C 64/118 425/375 |
| 2015/0307385 A1* | 10/2015 | Klein | B33Y 30/00 65/29.11 |

FOREIGN PATENT DOCUMENTS

| | | |
|---|---|---|
| JP | H11166054 A | 6/1999 |
| JP | 2009500194 | 8/2009 |
| JP | 2013244642 A | 12/2013 |
| WO | WO9719798 A2 | 6/1997 |
| WO | WO2007005236 A1 | 1/2007 |
| WO | 2019005042 A1 | 1/2019 |
| WO | WO-2019005042 A1 * | 1/2019 ........... B29C 64/255 |

* cited by examiner

APPARATUSES AND METHODS FOR FORMING THREE-DIMENSIONAL OBJECTS

This application is the U.S. national phase of International Application no. PCT/EP2016/055144, filed Mar. 10, 2016, which designated the US and claims priority to European Application Number EP15158654.2, filed Mar. 11, 2015, the entire contents of which are hereby incorporated by reference.

FIELD

The invention relates to apparatuses, methods, and materials for producing three-dimensional objects.

BACKGROUND

Additive fabrication, also known as three-dimensional printing, is a technique for forming three-dimensional objects by building up objects one portion at a time until a final three-dimensional object is produced. Additive techniques can be contrasted with subtractive techniques, such as milling, wherein portions of material are removed from a larger amount of material to produce the final three-dimensional object.

Fused filament fabrication (FFF), also known as fused deposition modeling (FDM), is an additive fabrication technique that involves heating a solid build material to a flowable state and dispensing the build material through a nozzle in accordance with computer data corresponding to the shape of the desired three-dimensional object. Typically, a FFF machine comprises a movable nozzle for dispensing a build material through an opening in the movable nozzle, a heating element for heating the build material to a flowable state, a driver connected to the movable nozzle for directing build material to the movable nozzle, and a build material supply connected to the driver. A platform, which is optionally movable, is also present to receive the build material dispensed through the opening in the movable nozzle.

Often, either the build material supply is connected to the driver, or the driver is connected to the movable nozzle by either the build material itself or by a flexible tube that allows transport of build material through the flexible tube. The build material supply usually takes the form of a bobbin on which a build material is wound. The build material is typically a thermoplastic.

As the FFF machine operates the build material is unwound from the bobbin via operation of the driver, and is directed to the heating element wherein the build material transitions to a flowable state. The flowable build material is then dispensed through the nozzle opening in accordance with the computer data corresponding to the shape of the desired three-dimensional object. Upon leaving the movable nozzle, the build material cools in the surrounding air and transitions back to the non-flowable state.

WO1997/19798, assigned to Stratasys, Inc., employs a multi-stage pressurization with the aim of increasing the build speed and enabling higher viscosity build materials. In an embodiment, the build material is present in the form of "wafers" that may be contained in cartridges. The wafers are directed via a driver to the heating element. After transitioning to the flowable state the wafers are moved through a curved communication channel and towards a rotary impeller. The rotary impeller drives the fluid towards the nozzle and out of the nozzle opening.

Three-dimensional objects produced by known FFF methods generally have poor mechanical properties compared to the same product produced by an injection molding technique. A method of FFF that yields three-dimensional objects having improved mechanical performance would thus be desirable.

SUMMARY

In existing FFF machines the build material is flexible so that it can be wound around a bobbin. The build material may also be flexible to allow easy transport from the material supply to the movable nozzle and to allow for movement of the movable nozzle while the material supply remains stationary. While providing several benefits, this flexibility generally limits the choice of materials.

The inventors found that these issues are at least partially alleviated in an apparatus wherein a nozzle opening and a hopper opening are capable of simultaneous alignment on a straight axis such that the build material is capable of traveling along the straight axis at least from the hopper opening until the build material, when present, attains a flowable state. In this way build materials may be used that are not sufficiently flexible prior to reaching the flowable state, or that flow at a viscosity that is higher than the build materials used in prior art FFF machines. Additionally, the residence time, the amount of time that the build material is maintained in the flowable state, may be lower than in a prior art machine that is capable of forming three-dimensional objects from a build material present in discontinuous form.

Accordingly, in accordance with a first embodiment of the invention, an apparatus for solid freeform fabrication comprises:
  a. a movable nozzle comprising a nozzle opening,
  b. a heating element connected to the movable nozzle,
  c. a driver connected to the movable nozzle,
  d. a platform for receiving a build material from the movable nozzle, and
  e. a hopper for providing the build material to the driver, the hopper comprising a hopper opening,
  wherein the nozzle opening and the hopper opening are capable of simultaneous alignment on a straight axis such that the build material, when present, is capable of traveling along the straight axis at least from the hopper opening until the build material attains a flowable state.

A second embodiment of the invention is a method of forming a three-dimensional object comprising the steps of:
  a. providing an apparatus comprising a movable nozzle, a driver, and a hopper opening aligned on a straight axis,
  b. dispensing a build material from a hopper through the hopper opening into the driver along the straight axis,
  c. directing the build material along the straight axis to the movable nozzle using the driver,
  d. heating the build material to a flowable state,
  e. selectively dispensing the build material through the movable nozzle onto a platform,
  f. repeating steps b-e a sufficient number of times to build up a three-dimensional object.

A third embodiment of the invention is a method of forming a three-dimensional object comprising the steps of:
  a. providing an apparatus comprising a movable nozzle and a driver aligned on a straight axis,
  b. positioning a build material comprising a straight longitudinal axis such that the straight longitudinal axis is aligned with the straight axis,
  c. directing the build material along the straight axis to the movable nozzle using the driver,
  d. heating the build material to a flowable state, e. selectively dispensing the build material through the movable nozzle onto a platform, f. repeating steps b-e a sufficient number of times to build up a three-dimensional object.

DETAILED DESCRIPTION

Typically, a FFF machine will have the material supply, the driver, and the movable nozzle present in co-axial alignment on a serpentine axis. Although there are several advantages to this technique, one disadvantage is that it limits the user to flexible build materials that are capable of traveling along the bends of the serpentine axis.

In accordance with an embodiment of the invention, the build material, when present, is capable of traveling along a straight axis until the build material attains a flowable state. In this way, build materials that are not sufficiently flexible to travel along a serpentine axis may be used in the FFF machine. In an embodiment, this is achieved in an apparatus wherein a nozzle opening and a hopper opening are capable of simultaneous alignment on a straight axis such that the build material, when present, is capable of traveling along the straight axis until the build material attains a flowable state. In said embodiment, the driver and the hopper opening need merely be capable of simultaneous alignment on a straight axis.

Figure 1:
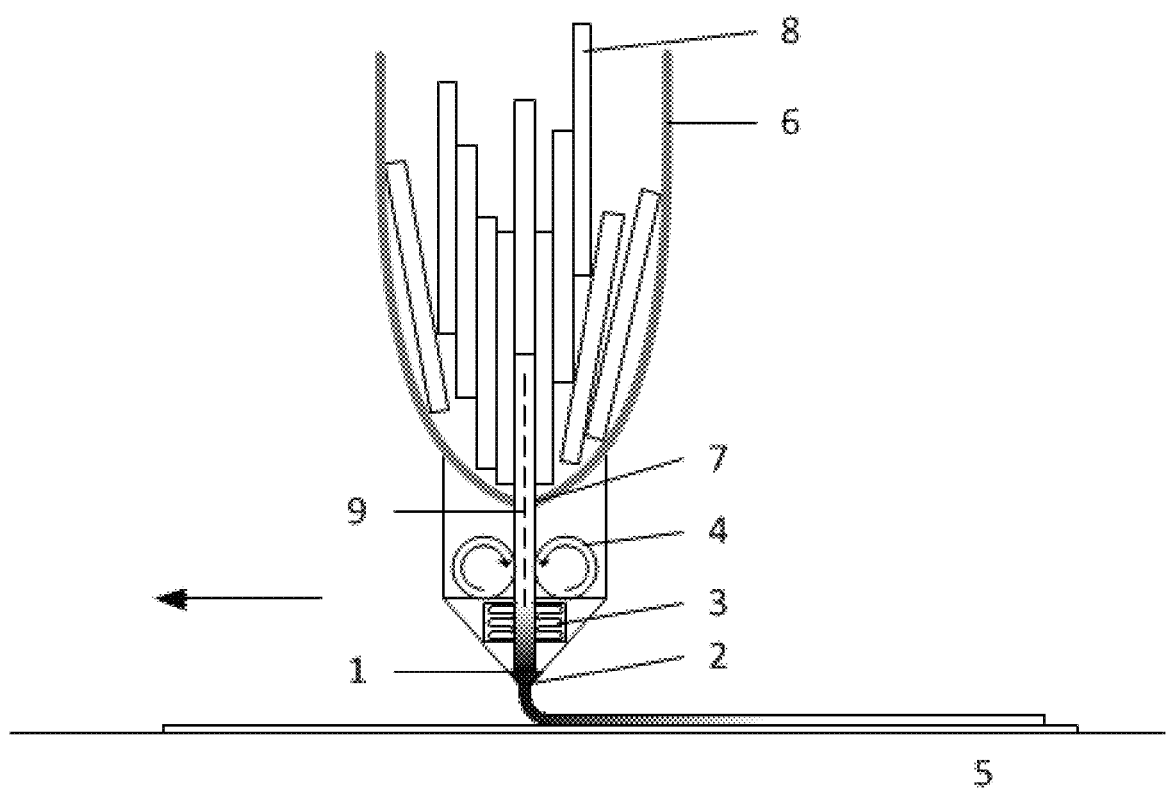
FIG. 1 is a schematic of an apparatus according to an embodiment of the invention.

FIG. 1 is a schematic of an apparatus according to an embodiment of the invention.

The apparatus comprises a movable nozzle 1 comprising a nozzle opening 2. The movement of the movable nozzle is controlled by appropriate hardware (not pictured) and software. The nozzle opening 2 is generally smaller than the thickness of the cross-section of the build material elements 8. In an embodiment, only the nozzle is movable and the platform is not movable.

A heating element 3 is connected to the movable nozzle. The heating element 3 causes an increase in the temperature of the build material to at least the point where the build material attains a flowable state, i.e. a state at which it can flow through the nozzle opening 2. Preferably, the heating element 3 is positioned near the nozzle opening 2 so that as little of the build material is present in the flowable state as possible.

The driver 4 is connected to the movable nozzle. The purpose of the driver 4 is to direct the build material to the movable nozzle 2. The driver 4 typically operates by manually engaging the build material to direct it toward the movable nozzle. As such, the driver may make use of toothed gears, screws, or other suitable ways of aiding the direction of the build material to the movable nozzle. As depicted in FIGS. 1-4, the driver comprises two rotating wheels that engage the build material at the build material's outer surface and direct the build material to the movable nozzle. A driver is aligned along an axis if the driver directs the build material traveling along the axis.

A platform 5 is present for receiving a build material from the movable nozzle. The three-dimensional object is thus formed on the platform 5. The platform may be movable in any number of directions, and is preferably movable in the z direction. The platform may be heated, such as from 50 to 100° C., preferably from 70-90° C. In an embodiment, the platform comprises a heater for heating the platform.

The hopper 6 provides the build material to the driver. The hopper may be physically bound to the driver and nozzle, as depicted in FIG. 1, or may be separated or separable from the driver and nozzle. The hopper comprises a hopper opening 7 through which build material elements 8 may pass.

A build material suitable for use in the apparatus may take any suitable form. Preferably, the build material is present in discontinuous form, such as in pieces having a maximum length of 25 cm or less. In an embodiment, the build material is present in elongated elements, such as rods. A rod shaped build material is depicted in FIG. 1. The elongated elements may have a circular, square, rectangular, star, or some other cross-section. In an embodiment, the build material comprises a straight longitudinal axis. The build material may additionally have on its surface a roughness, notches, protrusions, or other surface topology that facilitates gripping of the build material by the driver 4. The build material may be made, for example, via an extrusion or injection molding process. One advantage of the invention is that it may allow the economical use of injection molded build materials. As such, the composition of the build material may be changed by blending different polymers and fillers.

Another advantage of the invention may be that the build material comprising oriented filler may be used. When using build material comprising oriented filler, it is useful if the filler maintains its orientation in the formed three-dimensional object. The invention may allow for forming three-dimensional objects comprising oriented filler. Furthermore, materials comprising thermally conductive fillers may be employed. Thermally conductive materials may increase the risk of jamming in prior art FFF machines. Furthermore, the invention may allow for the use of build materials having a very low elongation at break, such as less than 2%. In an embodiment, the build material is rigid. In an embodiment, the build material has an elongation at break of 5% or less. In an embodiment, the build material has an elongation at break of 2% or less. In an embodiment, the build material has an elastic modulus of 5 GPa or greater. In an embodiment, the build material has an elastic modulus of 7 GPa or greater.

In an embodiment, a build material is present in the apparatus and the build material comprises filler. The filler may be incorporated in a vast array of thermoplastics capable of use in the claimed apparatus. In an embodiment, the build material comprises a filler and the filler is oriented in a direction substantially parallel to the longitudinal axis of the build material. In an embodiment, the build material comprises a filler and the filler is oriented in a direction substantially perpendicular to the longitudinal axis of the build material. In an embodiment, the filler is thermally conductive. In an embodiment, the filler is electrically conductive. In an embodiment, the build material comprises from 10 to 70 wt % of filler, preferably from 15 to 70 wt %, more preferably from 20 to 70 wt %.

In an embodiment, the filler comprises glass. In an embodiment the filler comprises a glass fiber. Glass fibers typically have a length to width ratio of from 2:1 to 5:1. In an embodiment, the filler is a mix of grinded glass and glass fibers in a ratio of grinded glass:glass fibers of from 80:20 to 20:80 by weight, preferably from 60:40 to 40:60 by weight. In an embodiment, the filler comprises glass spheres. In an embodiment, the filler comprises hollow glass spheres. In an embodiment, the filler comprises a glass flake.

In an embodiment, the filler comprises carbon fibers. In an embodiment, the carbon fiber is a carbon nanotube. In an embodiment, the filler comprises graphite. In an embodiment, the filler comprises expandable flake graphite. In an embodiment, the filler comprises graphene. In an embodiment, the filler comprises a mixture of carbon fiber and carbon nanotubes. In an embodiment, the filler comprises a mixture of carbon fiber and graphene.

In an embodiment, the filler comprises plastic fibers. In an embodiment, the filler comprises polyamide fibers, polyester fibers, aramid fibers, or polyvinyl alcohol fibers, or mixtures thereof.

In an embodiment, the filler comprises a metal powder or a metal fiber. In an embodiment, the filler comprises one or more of $TiO_2$, $ZnS$, $BaSO_4$, $MgO$, $SiO_2$, $Sb_2O_3$, $Al_2O_3$, $ZnO$, $Al(OH)_3$, $Mg(OH)_2$.

In an embodiment, the apparatus further comprises a magnetic field generator for orienting the filler. An example of a magnetic field generator is an electromagnet.

In an embodiment, the build material comprises one or more additives, such as heat stabilizers, process stabilizers, antioxidants, light stabilizers, plasticizers, antistatic agents, mold releasing agents, UV absorbers, lubricants, pigments, dyes, colorants, flow promoters, impact modifiers or a combination of one or more of the foregoing additives.

In an embodiment, the build material comprises a flame retardant. In an embodiment, the flame retardant is a mineral such as aluminum hydroxide (ATH), magnesium hydroxide (MDH), huntite, hydromagnesite, red phosphorus, antimony oxides, zinc borate, ammonium polyphosphate, graphite and nano clay.

In an embodiment, the flame retardant is an organohalogen compound such as decabromodiphenyl ether (decaBDE), decabromodiphenyl ethane (a replacement for decaBDE), polymeric brominated compounds such as brominated polystyrenes, brominated carbonate oligomers (BCOs), brominated epoxy oligomers (BEOs), tetrabromophthalic anhydride, tetrabromobisphenol A (TBBPA) and hexabromocyclododecane (HBCD). Most but not all halogenated flame retardants are used in conjunction with a synergist to enhance their efficiency. Antimony trioxide is widely used but other forms of antimony such as the pentoxide and sodium antimonate are also used.

In an embodiment, the flame retardant is an organophosphorus compound. This class includes organophosphates such as resorcinol bis(diphenylphosphate) (RDP), bisphenol A diphenyl phosphate (BADP), ammonium polyphosphate and tricresyl phosphate (TCP), phosphonates such as dimethyl methylphosphonate (DMMP), phosphinates such as aluminum diethyl phosphinate, phosphazenes, phospham and phosphoroxynitride.

In an embodiment, the flame retardant is a nitrogen based flame retardant such as melamine and melamine derivatives (i.e. salts with organic or inorganic acids such as boric acid, cyanuric acid, phosphoric acid or pyro/poly-phosphoric acid) and melamine homologues. In an embodiment, the flame retardant is a silicon based flame retardants such as organic silicone derivatives and polydimethyl siloxane. In an embodiment, the flame retardant is a sulfur-based flame retardant.

In an embodiment, the length of an element of build material is from 5 to 200 times the thickness of the element of build material. In an embodiment, the length of an element of build material is from 20 to 100 times the thickness of the element of build material. In an embodiment, the length of an element of build material is from 10 to 70 times the thickness of the element of build material.

In an embodiment, the hopper 6 is configured to provide the build material elements 8 to the driver in discontinuous form. For instance, the hopper may comprise a valve or similar mechanism that allows for controlled movement of build material from the hopper to the driver. In an embodiment, the hopper has a funnel-shaped interior that allows elements of build material to be controllably dispensed through the opening, as depicted in FIG. 1.

As depicted in FIG. 1, the driver 4 and the hopper opening 7 are aligned on a straight axis 9 such that the build material, when present, is capable of traveling along the straight axis 9 at least from the hopper opening 7 until the build material attains a flowable state. A flowable state is typically achieved near or within the heating element and is characterized by a sufficient reduction in the viscosity of the build material.

During operation of the apparatus the build material elements 8 are stored in hopper 6. The build material passes through hopper opening 7 and reaches the driver 4 along straight axis 9. The driver directs the build material to the movable nozzle through heating element 3. The build material reaches a flowable state near or within the heating element 3. The build material in a flowable state is then directed to movable nozzle 1 and through nozzle opening 2. As the movable nozzle moves in the indicated direction, the build material is dispensed onto platform 5 in accordance with the shape of a three-dimensional object. Dispensing onto a platform may entail dispensing the build material onto the platform itself, or onto a previously dispensed portion of build material already present on the platform.

Figure 2:
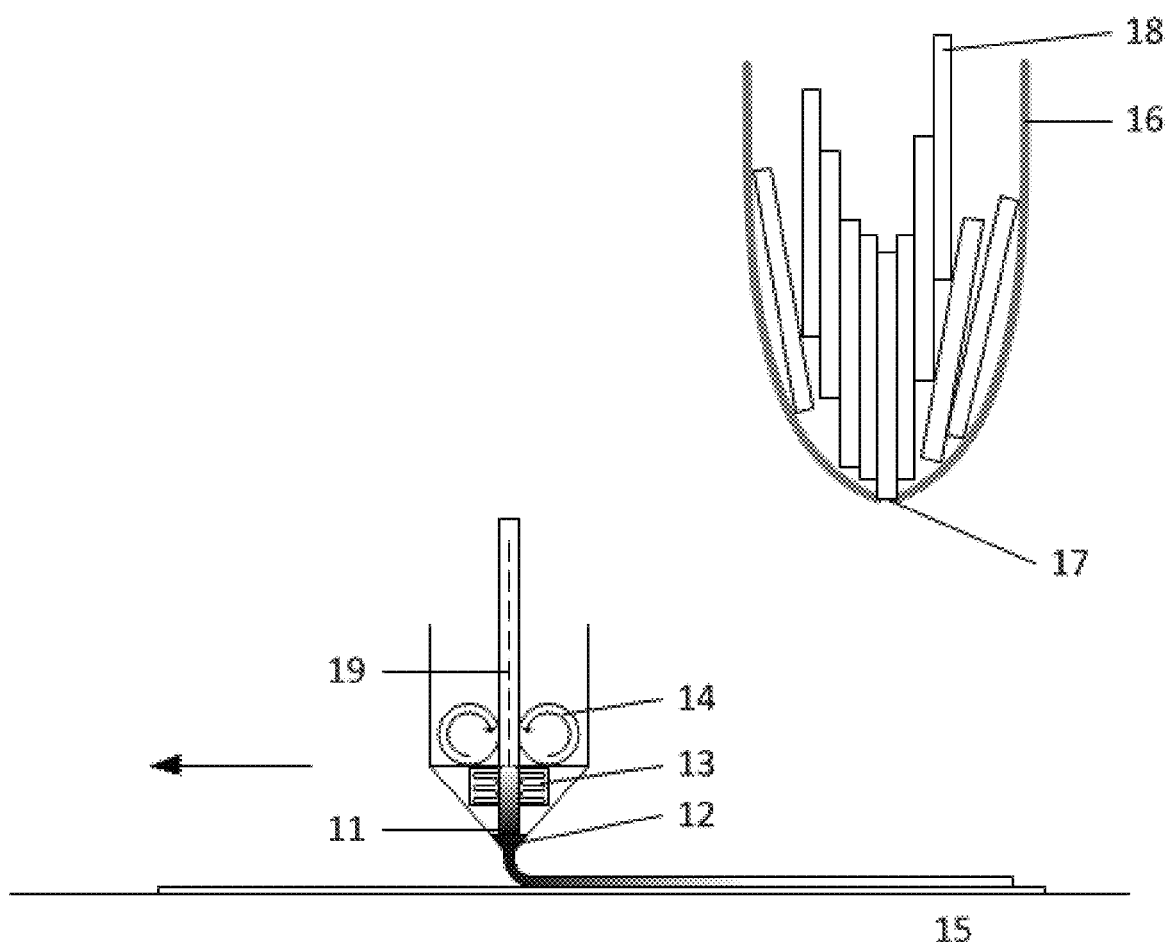
FIG. 2 is a schematic of an apparatus according to an embodiment of the invention.

FIG. 2 is a schematic of an apparatus according to an embodiment of the invention. The hopper 16 is not fixed to the driver 14 in the embodiment of FIG. 2, in contrast to the embodiment depicted in FIG. 1. In an embodiment, the hopper is separable from the driver. In an embodiment, the hopper is separated from the driver. In an embodiment, the hopper 16 is fixed separated from the driver 14, and the driver 14 and the movable nozzle 11 are movable such that the driver 14 and the hopper opening 17 may be temporarily aligned on a straight axis 19.

As depicted in FIG. 2, the movable nozzle 11 dispenses build material through the opening 12 while moving in the indicated direction. The driver 14 directs build material to the movable nozzle 11 through the heating element 13. At some point, such as when there is no build material remaining in the movable nozzle or when the amount of build material reaches a prescribed amount, the assembly comprising the movable nozzle 11, heating element 13, and driver 14 may move toward the hopper 16 in order to align the driver 14 and the hopper opening 17 on a straight axis 19 and build material elements 18 may enter the assembly. Alternatively, the hopper 16 may move toward the assembly, or the hopper and the assembly may both move.

Figure 3:
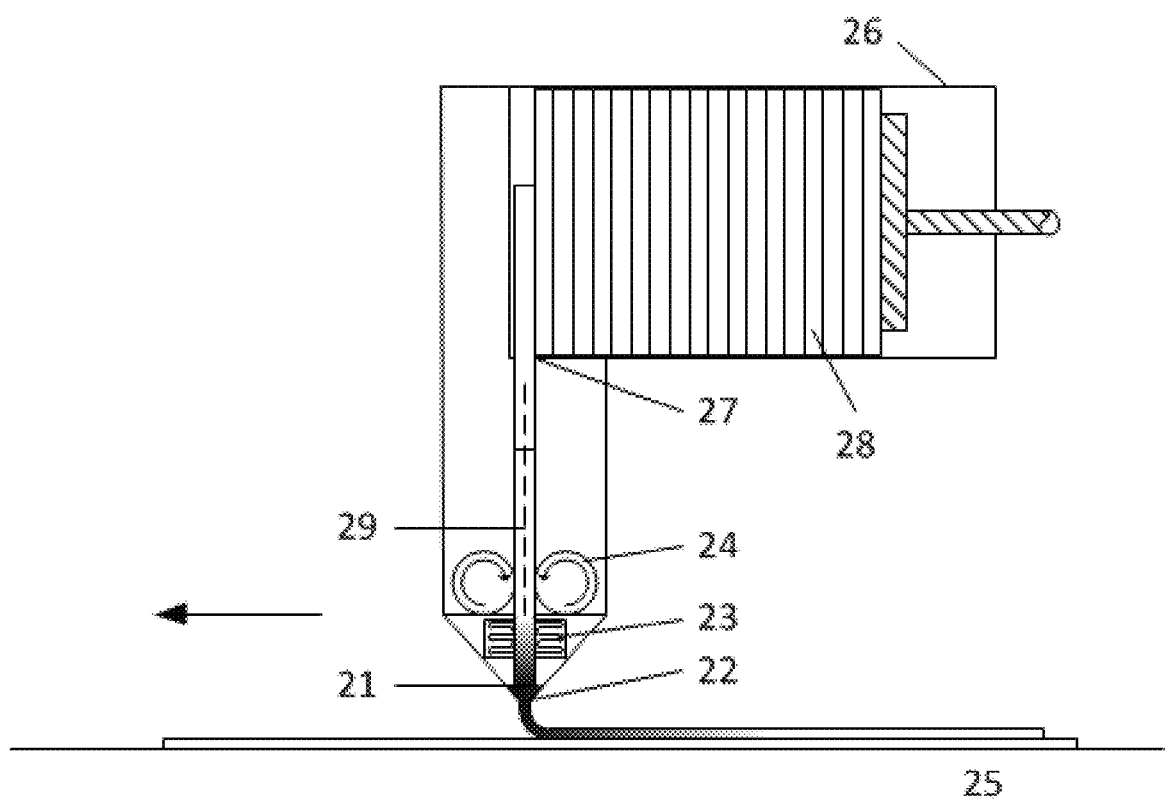
FIG. 3 is a schematic of an apparatus according to an embodiment of the invention.

FIG. 3 is a schematic of an apparatus according to an embodiment of the invention. As depicted in FIG. 3, the hopper 26 comprises a cartridge. The cartridge is configured to hold build material elements 28 in an ordered manner and dispense build material elements 28 one at a time through hopper opening 27. As in the embodiment depicted in FIG. 1, the hopper 26 is fixed to the driver 24. The hopper opening 27 and the driver 24 are aligned on straight axis 29. Build material leaves the hopper through hopper opening 27 and is provided to the driver 24. The build material is heated by heating element 23 to transition the build material to a flowable state in movable nozzle 21. The build material is then dispensed onto platform 25 through nozzle opening 22 as the assembly moves in the indicated direction.

Figure 4:
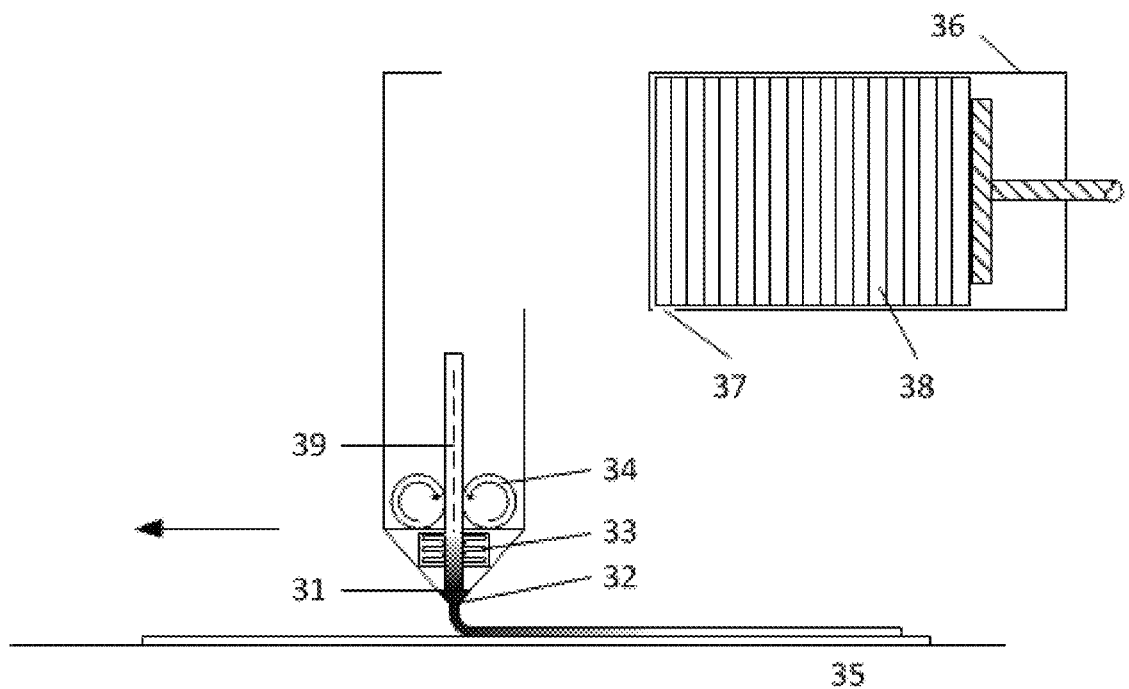
FIG. 4 is a schematic of an apparatus according to an embodiment of the invention.
Figure 5:
FIG. 5 is a SEM image of a cross-section of a printed part formed from 30% glass fiber filled PA410 associated with Example 1.

FIG. 4 is a schematic of an apparatus according to an embodiment of the invention. As depicted in FIG. 4, the hopper 36 comprises a cartridge. The cartridge is configured to hold build material elements 38 in an ordered manner and dispense build material elements 38 one at a time through hopper opening 37. The hopper 36 is not fixed to the driver 34. The hopper 36 is fixed separated from the driver 34, and the driver 34 and the movable nozzle 31 are movable such that the driver 34 and the hopper opening 37 may be temporarily aligned on straight axis 39.

As depicted in FIG. 4, the movable nozzle 31 dispenses build material through the opening 32 while moving in the indicated direction. The driver 34 directs build material to the movable nozzle 31 through the heating element 33. At some point, such as when there is no build material remaining in the movable nozzle or when the amount of build material reaches a prescribed amount, the assembly comprising the movable nozzle 31, heating element 33, and driver 34 may move toward the hopper 36 in order to align the driver 34 and the hopper opening 37 on straight axis 39 and build material elements 38 may enter the assembly. Alternatively, the hopper 36 may move toward the assembly, or the hopper and assembly may both move.

Although several embodiments have been described that include a build material present in the apparatus, it is not intended that the inventions described, especially in view of the following claims, are limited to apparatuses containing a build material. However, in an embodiment, the apparatus further comprises a build material.

The build material is capable of traveling along the straight axis at least from the hopper opening until the build material attains a flowable state. The straight axis need not be vertical. In an embodiment, the straight axis is substantially vertical. In an embodiment, the straight axis and the plane of the platform form an angle of from 80 to 90 degrees. In an embodiment, the straight axis and the plane of the platform form an angle of from 35 to 90 degrees. In an embodiment, the straight axis and the plane of the platform form an angle of from 60 to 90 degrees. In an embodiment, the straight axis and the plane of the platform form an angle of from 60 to 85 degrees.

In an embodiment, the apparatus further comprises a space and a controller. In an embodiment, the controller modifies the ambient conditions of a gas (such as air) in the space, such as the temperature, humidity, and/or composition to influence the behavior of the FFF process. In an embodiment, the space is enclosed. In an embodiment, the controller modifies the conditions proximate the movable nozzle. In an embodiment the controller directs forced gas to influence the hardening behavior of the build material. For example, the forced gas may be heated or cooled relative to the ambient conditions outside the space.

A second embodiment of the invention is a method of forming a three-dimensional object comprising the steps of:
 a. providing an apparatus comprising a movable nozzle, a driver, and a hopper opening aligned on a straight axis,
 b. dispensing a build material from a hopper through the hopper opening into the driver along the straight axis,
 c. directing the build material along the straight axis to the movable nozzle using the driver,
 d. heating the build material to a flowable state,
 e. selectively dispensing the build material through the movable nozzle onto a platform,
 f. repeating steps b-e a sufficient number of times to build up a three-dimensional object.

Selectively dispensing the build material can be achieved by either dispensing according to a certain shape, by e.g. moving the movable nozzle or the platform in accordance with the dimensions of a cross-section of the desired three-dimensional object.

In an embodiment, the step of providing an apparatus comprising a movable nozzle, a driver, and a hopper opening aligned on a straight axis is performed by a movable nozzle, a driver and a hopper opening that are fixed in alignment on a straight axis. In an embodiment, the step of providing an apparatus comprising a movable nozzle, a driver, and a hopper opening aligned on a straight axis is performed by aligning a movable nozzle, a driver and a hopper opening on a straight axis.

A third embodiment of the invention is a method of forming a three-dimensional object comprising the steps of:
 a. providing an apparatus comprising a movable nozzle and a driver aligned on a straight axis,
 b. positioning a build material comprising a straight longitudinal axis such that the straight longitudinal axis is aligned with the straight axis,
 c. directing the build material along the straight axis to the movable nozzle using the driver,
 d. heating the build material to a flowable state,
 e. selectively dispensing the build material through the movable nozzle onto a platform,
 f. repeating steps b-e a sufficient number of times to build up a three-dimensional object.

In an embodiment, the provided apparatus comprises a movable nozzle, a driver, and a hopper opening aligned on a straight axis.

Further, the platform and/or the nozzle may be movable. Accordingly, in a fourth embodiment of the invention is an apparatus for solid freeform fabrication comprising:
 a. a nozzle comprising a nozzle opening,
 b. a heating element connected to the nozzle,
 c. a driver connected to the nozzle,
 d. a movable platform for receiving a build material from the nozzle, and
 e. a hopper for providing the build material to the driver, the hopper comprising a hopper opening,
 wherein the nozzle opening and the hopper opening are capable of simultaneous alignment on a straight axis such that the build material, when present, is capable of traveling along the straight axis at least from the hopper opening until the build material attains a flowable state.

A fifth embodiment of the invention is a method of forming a three-dimensional object comprising the steps of:
 a. providing an apparatus comprising a nozzle, a driver, and a hopper opening aligned on a straight axis,
 b. dispensing a build material from a hopper through the hopper opening into the driver along the straight axis,
 c. directing the build material along the straight axis to the nozzle using the driver,
 d. heating the build material to a flowable state,
 e. selectively dispensing the build material through the nozzle onto a movable platform,
 f. repeating steps b-e a sufficient number of times to build up a three-dimensional object.

A sixth embodiment of the invention is a method of forming a three-dimensional object comprising the steps of:
 a. providing an apparatus comprising a nozzle and a driver aligned on a straight axis, b. positioning a build material comprising a straight longitudinal axis such that the straight longitudinal axis is aligned with the straight axis, c. directing the build material along the straight axis to the nozzle using the driver, d. heating the build material to a flowable state, e. selectively dispensing the build material through the nozzle onto a movable platform, f. repeating steps b-e a sufficient number of times to build up a three-dimensional object.

EXAMPLE

Example 1—Printing with 30% Glass Fiber Filled PA 410

A Cartesio FFF machine is modified such that the nozzle opening and the hopper opening are aligned on a straight axis. Build material having a circular cross-section of 1.75 mm in diameter and a length of 150 mm are formed via an injection molding process. The build material is 30% glass fiber filled DSM EcoPaXX® (polyamide 410). The glass fibers are oriented longitudinally.

A 20×20×20 mm hollow calibration cube (www.thingiverse.com) is printed. The nozzle temperature is set at 265° C. The platform is heated to 80° C. The print speed is 50 mm/min. 3D lac adhesion promoter is applied to the build platform.

The printed cube shows good resolution and little warping. A cross-section of the material is formed and a SEM image of the cross-section recorded at ~500× magnification. The image is shown in FIG. 1. From the image it can be seen that the glass fibers remain oriented after printing.

Example 2—Tensile Test

ISO 527-1BA type tensile bars are printed from the 30% glass fiber filled DSM EcoPaXX® (polyamide 410) and an unfilled polyamide 6 using the apparatus described in Example 1.

The nozzle temperature is either 265° C. or 285° C. The print speed is 50 mm/min. The print direction is 45°/45°. The platform is heated to 80° C. The print speed is 50 mm/min.

After printing, the tensile bars are allowed to sit at room temperature and 50% relative humidity for at least 24 hours. Young's modulus is then measured according to ISO 527. The results are shown in Table 1, below.

TABLE 1

| Example 2 Results | | | |
| --- | --- | --- | --- |
| Example | Material | Nozzle Temp. | Young's Modulus |
| 2-1 | 30% GF PA 410 | 265° C. | 2848 MPa |
| 2-2 | 30% GF PA 410 | 285° C. | 3327 MPa |
| 2-3 | PA 6 | 265° C. | 2084 MPa |

Each material prints successfully. The Young's Modulus is much higher with the glass fiber filled materials.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this description includes all modifications and equivalents of the subject matter recited in the claims appended hereto as permitted by applicable law. While certain optional features are discussed as embodiments of the invention, the description is meant to encompass and specifically disclose all combinations of these embodiments unless specifically indicated otherwise or physically impossible.

The invention claimed is:

1. An apparatus for solid freeform fabrication comprising:
   a) a movable nozzle comprising a nozzle opening,
   b) a heating element connected to the movable nozzle,
   c) a driver connected to the movable nozzle,
   d) a platform for receiving a build material from the movable nozzle, and
   e) a hopper for providing the build material to the driver, the hopper comprising a build material inlet opening and a build material outlet opening, wherein the nozzle opening and the build material outlet opening are capable of simultaneous alignment on a straight axis such that the build material, when present, is capable of traveling along the straight axis at least from the build material outlet opening until the build material attains a flowable state;

wherein the nozzle opening, the driver, the build material inlet opening, and the build material outlet opening are aligned on the straight axis.

2. The apparatus according to claim 1, wherein the build material, when present, is capable of traveling along the straight axis at least from the build material outlet opening to the nozzle.

3. The apparatus according to claim 2, wherein the build material, when present, is capable of traveling along the straight axis at least from the build material inlet opening to the nozzle opening.

4. The apparatus according to claim 3, wherein the hopper further comprises a valve.

5. The apparatus according to claim 3, wherein the hopper is fixed to the driver.

6. The apparatus according to claim 3, wherein the hopper is separated from the driver.

7. The apparatus according to claim 6, wherein the platform comprises a heater for heating the platform.

8. The apparatus according to claim 1, further comprising an element of build material present in the hopper in discontinuous form.

9. The apparatus according to claim 8, wherein the length of the element of build material is from 5 to 200 times the thickness of the element of build material.

10. The apparatus according to claim 9, wherein the length of the element of build material is from 20 to 200 times the thickness of the element of build material.

11. The apparatus according to claim 8, wherein the build material comprises from 15 to 70 wt % of filler and the filler comprises glass fibers, carbon fibers, plastic fibers, or metal fibers.

12. The apparatus according to claim 8, wherein the build material comprises from 15 to 70 wt % of filler and the filler is oriented in a direction substantially parallel or substantially perpendicular to the longitudinal axis of the build material.

13. The apparatus according to claim 8, wherein the hopper comprises a funnel-shaped interior.

14. The apparatus according to claim 13, wherein the hopper is configured to allow elements of build material present in the hopper in discontinuous form to be controllably dispensed through the build material outlet opening.

15. A method of forming a three-dimensional object comprising the steps of:
   a) providing an apparatus comprising a movable nozzle, a driver, and a hopper opening aligned on a straight axis,
   b) dispensing a build material from a hopper comprising a funnel-shaped interior configured to avow a plurality of elements of build material to be controllably dispensed through the hopper opening into the driver along the straight axis,
   c) directing the build material along the straight axis to the movable nozzle using the driver,
   d) heating the build material to a flowable state,
   e) selectively dispensing the build material through the movable nozzle onto a platform in accordance with computer data corresponding to a three-dimensional object,
   f) repeating steps b-e a plurality of times to build up the three-dimensional object.

16. A method of forming a three-dimensional object comprising the steps of:
   a) providing an apparatus comprising a movable nozzle, a hopper comprising a build material inlet opening and a hopper build material outlet opening, and a driver; wherein the build material inlet opening, build material outlet opening, and driver are aligned on a straight axis,
   b) positioning a build material comprising a straight longitudinal axis such that the straight longitudinal axis is aligned with the straight axis,
   c) directing the build material along the straight axis to the movable nozzle using the driver,
   d) heating the build material to a flowable state,
   e) selectively dispensing the build material through the movable nozzle onto a platform in accordance with computer data corresponding to a three-dimensional object,
   f) repeating steps b-e a plurality of times to build up the three-dimensional object.

17. The method according to claim 16, wherein the build material comprises from 15 to 70 wt % of filler and the filler comprises glass fibers, carbon fibers, plastic fibers, or metal fibers.

18. The method according to claim 16, wherein the build material comprises from 15 to 70 wt % of a filler and the filler is oriented in a direction substantially parallel or substantially perpendicular to the longitudinal axis of the build material.

19. The apparatus according to claim 16, wherein a length of the build material is from 20 to 100 times a thickness of the build material.

20. The apparatus according to claim 19, wherein the hopper comprises a funnel-shaped interior.

* * * * *